US010906486B2

(12) United States Patent
Tashiro et al.

(10) Patent No.: US 10,906,486 B2
(45) Date of Patent: Feb. 2, 2021

(54) IMPACT ABSORPTION STRUCTURE FOR VEHICLES

(71) Applicant: MAZDA MOTOR CORPORATION, Hiroshima (JP)

(72) Inventors: Kuniyoshi Tashiro, Hiroshima (JP); Ippei Kuroda, Hiroshima (JP); Satoshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 42 days.

(21) Appl. No.: 16/348,119

(22) PCT Filed: Oct. 11, 2017

(86) PCT No.: PCT/JP2017/036855
§ 371 (c)(1),
(2) Date: May 7, 2019

(87) PCT Pub. No.: WO2018/088100
PCT Pub. Date: May 17, 2018

(65) Prior Publication Data
US 2019/0256023 A1    Aug. 22, 2019

(30) Foreign Application Priority Data

Nov. 8, 2016  (JP) ................................. 2016-217967

(51) Int. Cl.
*B60R 19/34* (2006.01)
*B60R 19/18* (2006.01)
(Continued)

(52) U.S. Cl.
CPC .............. *B60R 19/34* (2013.01); *B60R 19/18* (2013.01); *B62D 21/15* (2013.01); *B62D 25/08* (2013.01);
(Continued)

(58) Field of Classification Search
CPC . B60R 19/34; B60R 19/18; B60R 2019/1806; B62D 25/08; B62D 25/20; B62D 21/15
(Continued)

(56) References Cited

U.S. PATENT DOCUMENTS 7,059,642 B2    6/2006  Ohno et al.
8,042,847 B2 *  10/2011  Garg ....................... B60R 19/12
                                                                293/102
(Continued)

FOREIGN PATENT DOCUMENTS

CN        106240507 A    12/2016
JP        2003127896 A    5/2003
(Continued)

OTHER PUBLICATIONS

International Search Report issued in PCT/JP2017/036855; dated Nov. 28, 2017.

*Primary Examiner* — Pinel E Romain
(74) *Attorney, Agent, or Firm* — Studebaker & Brackett PC

(57) ABSTRACT

The crush can 4 is provided therein with the ribs 46 and 47 extending in the vehicle front and rear direction. The bumper beam 6 is provided therein with the ribs 66 and 67 extending in the vehicle front and rear direction. The rib 46 of the crush can 4 and the rib 66 of the bumper beam 6 are disposed at approximately the same height, and the rib 47 of the crush can 4 and the rib 67 of the bumper beam 6 are disposed at approximately the same height.

4 Claims, 12 Drawing Sheets

(51) Int. Cl.
  *B62D 25/08* (2006.01)
  *B62D 25/20* (2006.01)
  *B62D 21/15* (2006.01)

(52) U.S. Cl.
  CPC ...... *B62D 25/20* (2013.01); *B60R 2019/1806* (2013.01)

(58) Field of Classification Search
  USPC .......................................................... 293/133
  See application file for complete search history.

(56) References Cited

U.S. PATENT DOCUMENTS

| | | | |
|---|---|---|---|
| 9,067,550 B2 * | 6/2015 | Nagwanshi | B60R 19/22 |
| 9,598,033 B1 * | 3/2017 | Berger | B60R 19/18 |
| 9,884,599 B2 * | 2/2018 | Daido | B60R 19/34 |
| 10,005,409 B2 * | 6/2018 | Marur | B60R 19/18 |
| 2002/0079711 A1 * | 6/2002 | Kajiwara | B60R 19/18 |
| | | | 293/133 |
| 2013/0257070 A1 | 10/2013 | Ebara et al. | |
| 2016/0332587 A1 | 11/2016 | Ginja et al. | |

FOREIGN PATENT DOCUMENTS

| | | | |
|---|---|---|---|
| JP | 2004237902 A | 8/2004 |
| JP | 2006347262 A | 12/2006 |
| JP | 2011057158 A | 3/2011 |
| JP | 2013203304 A | 10/2013 |
| WO | 2015097410 A1 | 7/2015 |
| WO | 2016148635 A1 | 9/2016 |

* cited by examiner (RIGHT)INNER ← VEHICLE WIDTH DIRECTION → OUTER(LEFT)

(RIGHT)INNER ← VEHICLE WIDTH DIRECTION → OUTER(LEFT)

IMPACT ABSORPTION STRUCTURE FOR VEHICLES

TECHNICAL FIELD

The present disclosure relates to an impact absorption structure provided in a vehicle, and more particularly, belongs to a technical field of a structure of absorbing energy by crushing deformation in a vehicle front and rear direction when an impact is applied from the vehicle front and rear direction.

BACKGROUND ART

In general, on the front part of an automobile, a front side frame is disposed on each of right and left sides of the front part to extend in a front and rear direction of the automobile. Crush cans are attached to the front end portions of these front side frames so as to absorb energy by crushing and deforming in the front and rear direction when an impact load is applied from the front of the automobile. Moreover, a bumper beam is fixed to the front end portions of the right and left crush cans so as to extend in a width direction of the automobile (for example, see PATENT DOCUMENTS 1 and 2).

The crush can of PATENT DOCUMENT 1 is provided therein with ribs extending in the front and rear direction. Furthermore, the bumper beam of PATENT DOCUMENT 2 has a front wall part and a rear wall part extending in a vertical direction and ribs extending from a rear surface of the front wall part to a front surface of the rear wall part and extending in a right and left direction.

CITATION LIST

Patent Document

PATENT DOCUMENT 1: Japanese Unexamined Patent Publication No. 2003-127896
PATENT DOCUMENT 2: Japanese Unexamined Patent Publication No. 2013-203304

SUMMARY OF THE INVENTION

Technical Problem

As disclosed in PATENT DOCUMENT 1, the ribs provided in the crush cans can increase support stiffness, and an energy absorption amount, of the bumper beam.

Here, assuming a light collision in which a vehicle collides with an obstacle at a vehicle speed, for example, 15 km/h or less, the impact load is applied to the bumper beam and then is applied to the crush cans. In such a case, the impact load applied to the bumper beam could easily be transmitted to the crush cans at an initial stage by the ribs provided to the bumper beam as disclosed in PATENT DOCUMENT 2. However, if the ribs extending in the front and rear direction as disclosed in PATENT DOCUMENT 1 are provided to the crush cans when a collision load at the time of a light collision is applied to the bumper beam and is transmitted to the crush cans via the ribs of the bumper beam, the load is transmitted only to a part of the front end portions of the ribs of the crush cans, such that only a part of the ribs is deformed and thus the load is not transmitted, and the other parts may serve as props to interfere the crushing and deforming of the crush cans, causing deformation of the front side frames in some cases.

That is, even though an impact load is applied to the crush cans at the initial stage of the light collision, the crush cans might not be crushed and deformed as desired due to the influence of the ribs of the crush cans.

The present invention has been made to solve the aforementioned problems, and an object of the present invention is to improve energy absorption performance of a crush can having ribs by allowing the crush can to be reliably crushed due to an impact load at the time of a light collision, thereby reducing deformation of a front side frame.

Solution to the Problem

In order to achieve the aforementioned object, in the present invention, when viewed from a front and rear direction, ribs of a crush can and ribs of a bumper beam are disposed to overlap each other.

The first invention is directed to an impact absorption structure for a vehicle in which right and left crush cans are respectively attached to vehicle front end portions of front side frames disposed on both right and left sides of the vehicle and extending in a vehicle front and rear direction, and a bumper beam is attached to vehicle front end portions of the right and left crush cans to extend in a vehicle width direction, wherein each of the crush cans is formed in a cylindrical shape extending in the vehicle front and rear direction and is provided therein with a rib extending in the vehicle front and rear direction continuously to an inner surface of the crush can, the bumper beam is formed in a cylindrical shape extending in a vehicle width direction and is provided therein with a rib extending in the vehicle front and rear direction continuously to an inner surface of the bumper beam, and the rib of the crush can and the rib of the bumper beam are disposed at approximately a same height.

According to such a configuration, since the ribs are provided inside the crush can, support stiffness of the bumper beam and an energy absorption amount of the crush can increase. On the other hand, at the time of a light collision, an impact load applied to the bumper beam is applied to the crush can. In such a case, when viewed from the vehicle front and rear direction, the ribs of the bumper beam and the ribs of the crush can are positioned to overlap each other and the ribs of the bumper beam and the crush can extend in the front and rear direction approximately coinciding with the input direction of the impact load. Hence, the impact load is transmitted from the ribs of the bumper beam to the ribs of the crush can. In this way, since the impact load at the time of the light collision is approximately uniformly applied to the entire front end portion of the ribs of the crush can via the ribs of the bumper beam, the ribs of the crush can are deformed such that the ribs can be prevented from serving as props, so that the crush can is reliably crushed and deformed by the impact load at the time of the light collision.

In the second invention, the crush can is provided therein with a first rib and a second rib extending in the vehicle front and rear direction and spaced apart from each other in a vertical direction, the bumper beam is provided therein with a first rib and a second rib extending in the vehicle front and rear direction and spaced apart from each other in the vertical direction, and the first rib of the crush can and the first rib of the bumper beam are disposed at approximately the same height, and the second rib of the crush can and the second rib of the bumper beam are disposed at approximately the same height.

According to such a configuration, the impact load is transmitted from the first rib and the second rib of the bumper beam to the first rib and the second rib of the crush can. In this way, when the crush can is provided with a plurality of ribs, each rib can be prevented from serving as a prop.

In the third invention, the crush can includes an upper wall part and a lower wall part extending in the vehicle front and rear direction, the bumper beam includes an upper plate part and a lower plate part extending in the vehicle front and rear direction, and the upper wall part of the crush can and the upper plate part of the bumper beam are disposed at approximately the same height, and the lower wall part of the crush can and the lower plate part of the bumper beam are disposed at approximately the same height.

According to such a configuration, the impact load is transmitted from the upper plate part and the lower plate part of the bumper beam to the upper wall part and the lower wall part of the crush can. In this way, at the initial stage in which the impact load at the time of the light collision is applied, the upper wall part and the lower wall part of the crush can are deformed, so that the upper wall part and the lower wall part can be prevented from serving as props.

In the fourth invention, the rib of the crush can is a horizontal rib extending in the vehicle width direction, the crush can is provided therein with a vertical rib extending from the horizontal rib to the upper wall part or the lower wall part of the crush can and extending in the vehicle front and rear direction, the bumper beam includes a rear plate part located at a vehicle rear side, when viewed from the vehicle front and rear direction, the vertical rib of the crush can and the rear plate part of the bumper beam are disposed to overlap each other, and a thickness of the vertical rib of the crush can is set thinner than a thickness of the rear plate part of the bumper beam.

According to such a configuration, the vertical rib is provided inside the crush can, so that support stiffness of the bumper beam is further increased. Furthermore, when the impact load applied to the bumper beam at the time of the light collision is applied to the crush can, a part of the impact load is transmitted to the vertical rib of the crush can via the rear plate part of the bumper beam. In such a case, the thickness of the vertical rib is thinner than that of the rear plate part of the bumper beam, so that the vertical rib can be deformed by the rear plate part of the bumper beam.

Advantages of the Invention

According to the first invention, the ribs of the crush can and the ribs of the bumper beam are disposed at approximately the same heights, so that it is possible to reliably crush the crush can by the impact load at the time of the light collision. In this way, it is possible to improve energy absorption performance of the crush can, so that it is possible to suppress the deformation of the front side frame.

According to the second invention, the first rib of the crush can and the first rib of the bumper beam are disposed at approximately the same height and the second rib of the crush can and the second rib of the bumper beam are disposed at approximately the same height, so that when the crush can is provided with a plurality of ribs, each rib can be prevented from serving as a prop.

According to the third invention, the upper wall part of the crush can and the upper plate part of the bumper beam are disposed at approximately the same height and the lower wall part of the crush can and the lower plate part of the bumper beam are disposed at approximately the same height, so that it is possible to prevent the upper wall part and the lower wall part of the crush can from serving as props.

According to the fourth invention, when viewed from the vehicle front and rear direction, the vertical rib of the crush can and the rear plate part of the bumper beam are disposed to overlap each other and the thickness of the vertical rib of the crush can is thinner than that of the rear plate part of the bumper beam, so that it is possible to deform the vertical rib with the rear plate part of the bumper beam by the impact load at the time of the light collision. In this way, it is possible to prevent the vertical rib from serving as a prop.

DESCRIPTION OF EMBODIMENTS

Hereinafter, an embodiment of the present invention will be described in detail with reference to the drawings. The following description of a preferred embodiment is merely exemplary and is not intended to limit the present invention, applications thereof, or usages thereof.

Figure 1:
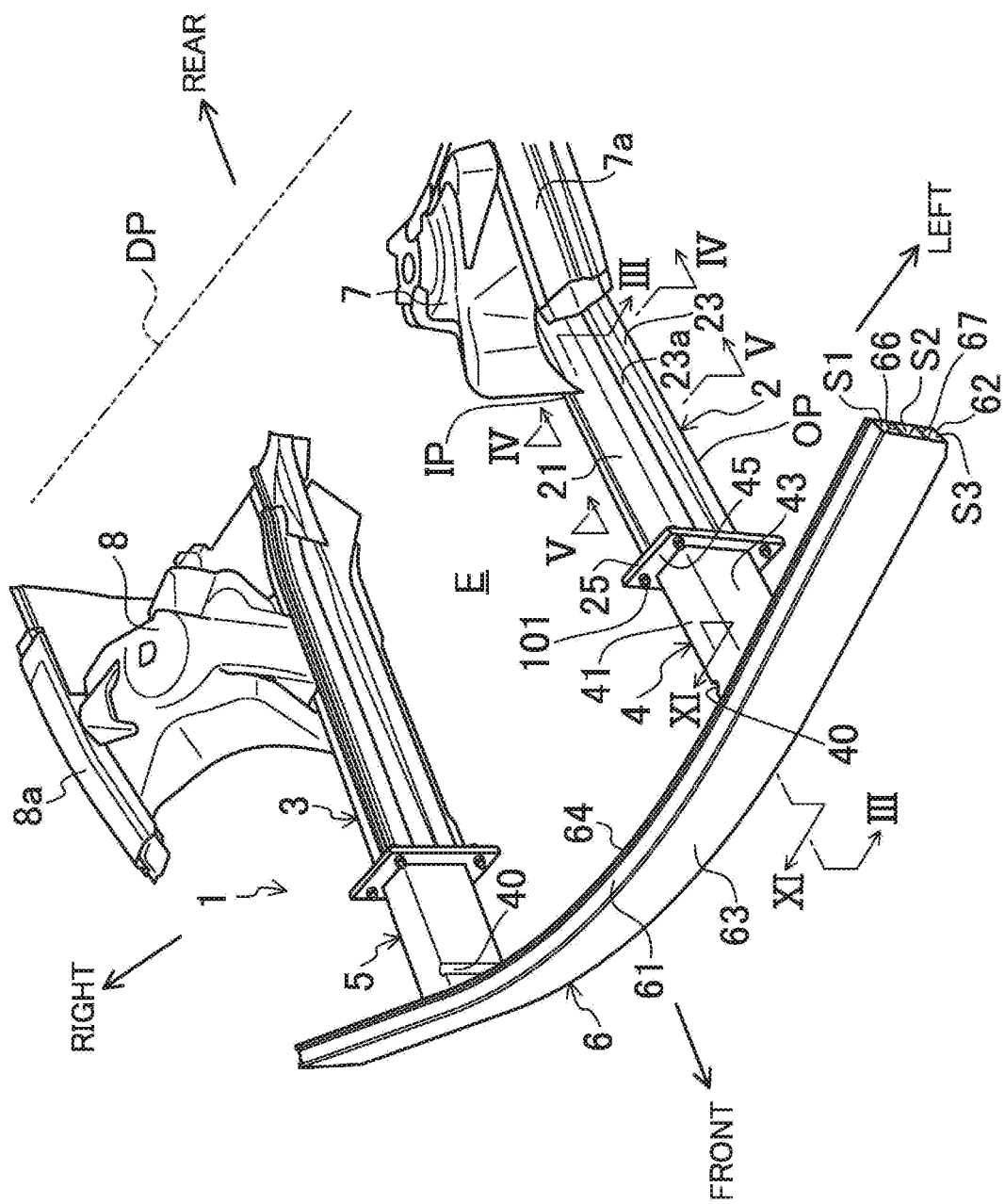
FIG. 1 is a perspective view when an impact absorption structure for a vehicle according to an embodiment of the present invention is viewed from the upper left.

FIG. 1 is a perspective view when an impact absorption structure 1 of a vehicle according to an embodiment of the present invention is viewed from an obliquely upper left. The impact absorption structure 1 is provided, for example, at the front part of a passenger vehicle, and includes a left front side frame 2, a right front side frame 3, a left crush can 4, a right crush can 5, and a bumper beam 6 extending in a vehicle width direction. The left crush can 4 and the right crush can 5 are attached to the front end portions of the left front side frame 2 and the right front side frame 3, respectively. The bumper beam 6 is attached to the front end portions of the left crush can 4 and the right crush can 5. In the embodiment, it is assumed that the front side of the vehicle is simply referred to as "front", the rear side of the vehicle is simply referred to as "rear", the left side of the vehicle is simply referred to as "left", and the right side of the vehicle is simply referred to as "right".

The left front side frame 2 and the right front side frame 3 are disposed on the left side and right side of a vehicle body, respectively, and extend in a front and rear direction while being separated from each other in a right and left direction. Between the left front side frame 2 and the right front side frame 3, an engine, a transmission and the like (not illustrated) are disposed. Furthermore, the vehicle is provided with a dash panel DP (its schematic shape is indicated by a virtual line) that divides an engine compartment E and a passenger compartment (not illustrated). The dash panel DP extends approximately vertically. The left front side frame 2 extends to the front from the vicinity of the left side of the dash panel DP, and the right front side frame 3 extends to the front from the vicinity of the right side of the dash panel DP.

The front part of the vehicle is provided with a left suspension tower 7 formed in a tower shape on a left side of the left front side frame 2 and a right suspension tower 8 formed in a tower shape on a right side of the right front side frame 3. The sides of the left suspension tower 7 and the right suspension tower 8 are provided with reinforcements 7a and 8a, respectively.

Furthermore, the vehicle is provided with a front bumper, a fender, an engine hood, and the like, but they are not illustrated.

(Configuration of Front Side Frame)

Figure 3:
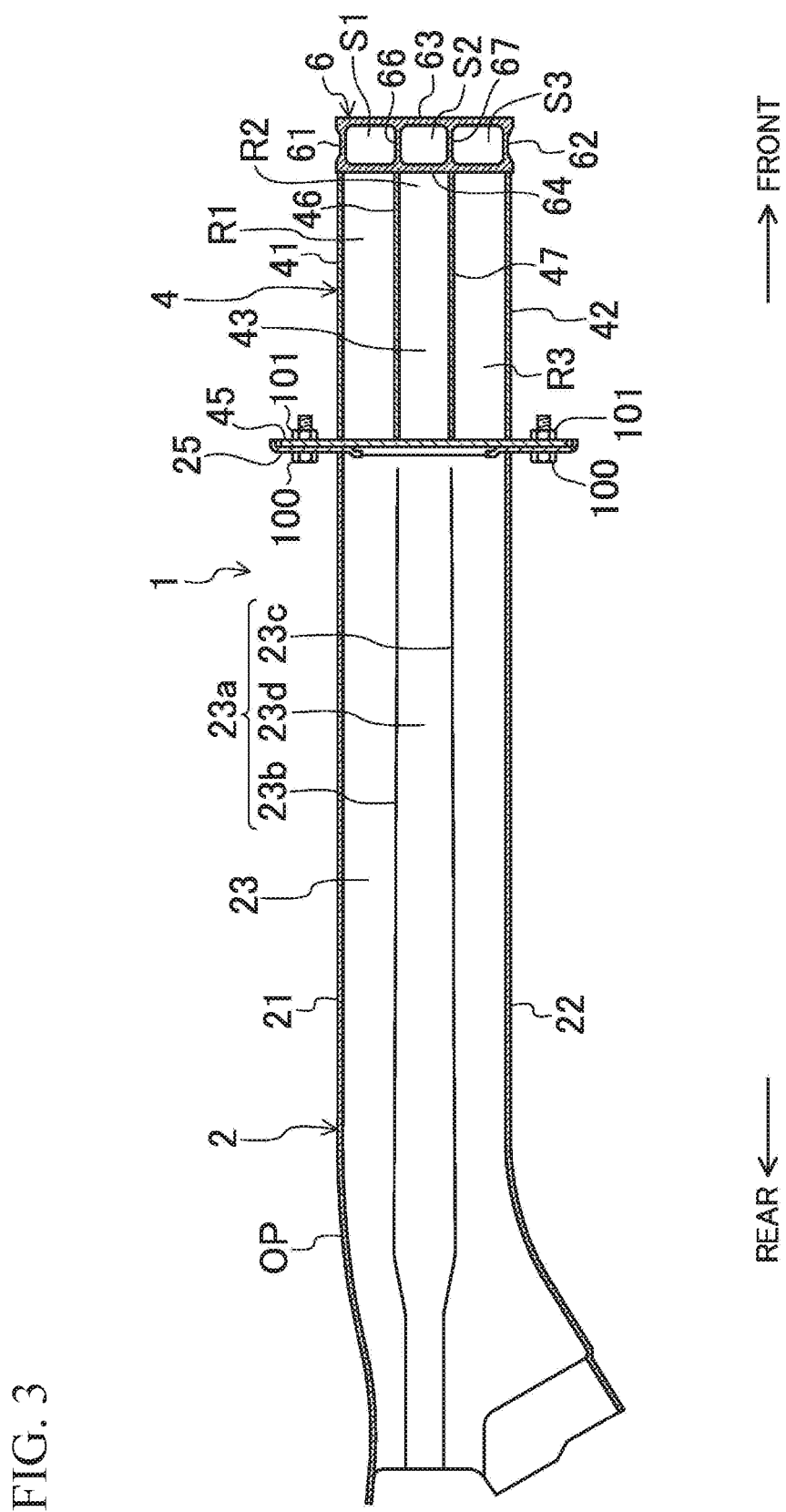
FIG. 3 is a cross-section taken along line in FIG. 1.
Figure 4:
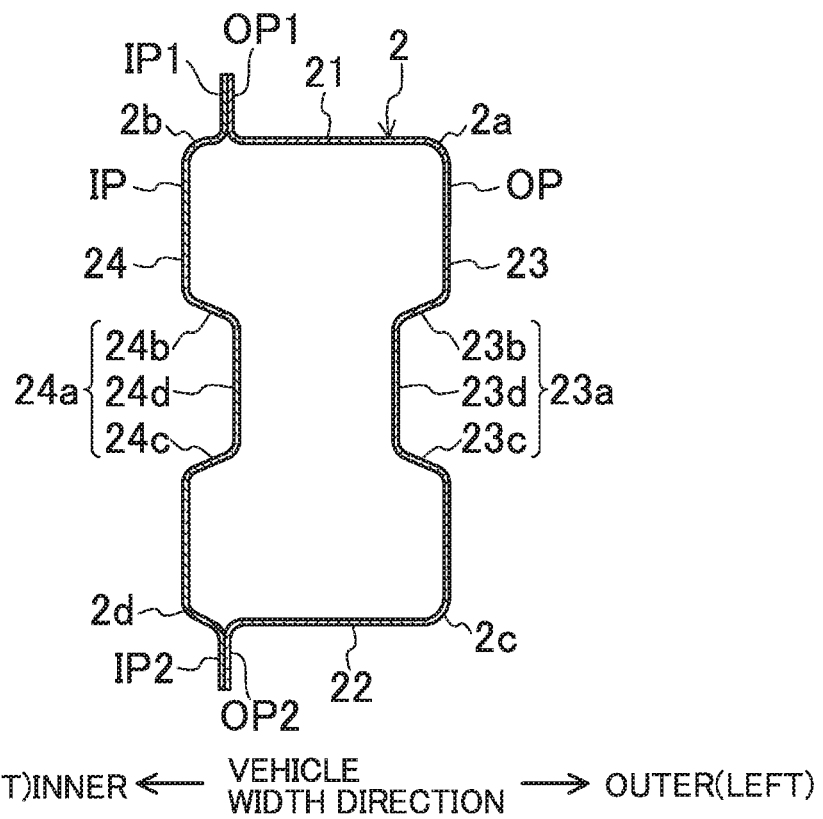
FIG. 4 is a cross-section taken along line IV-IV in FIG. 1.
Figure 5:
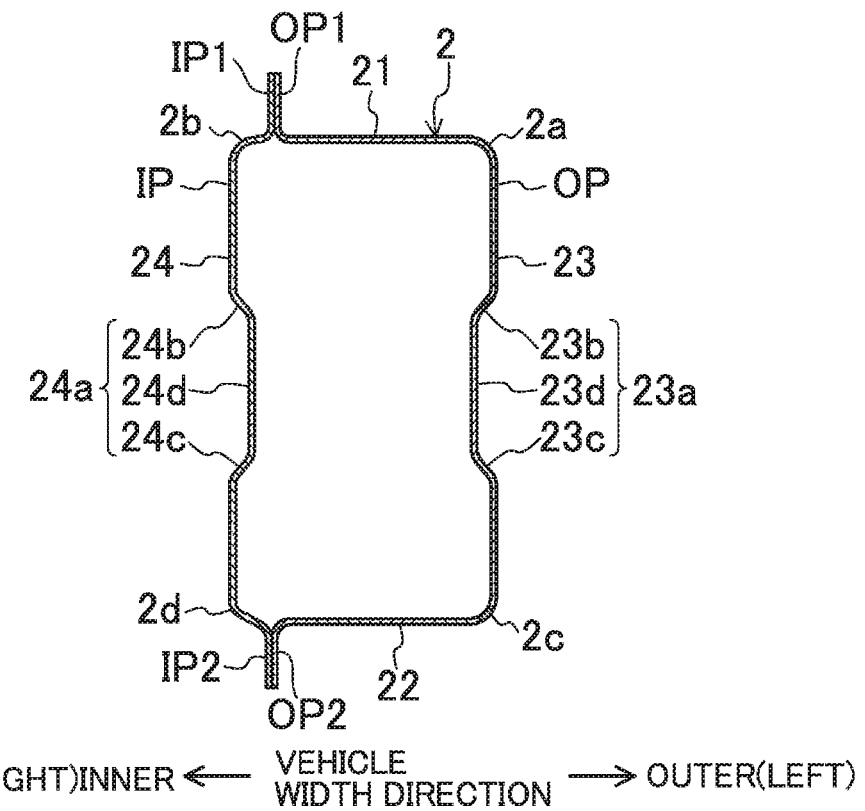
FIG. 5 is a cross-section taken along line V-V in FIG. 1.
Figure 6:
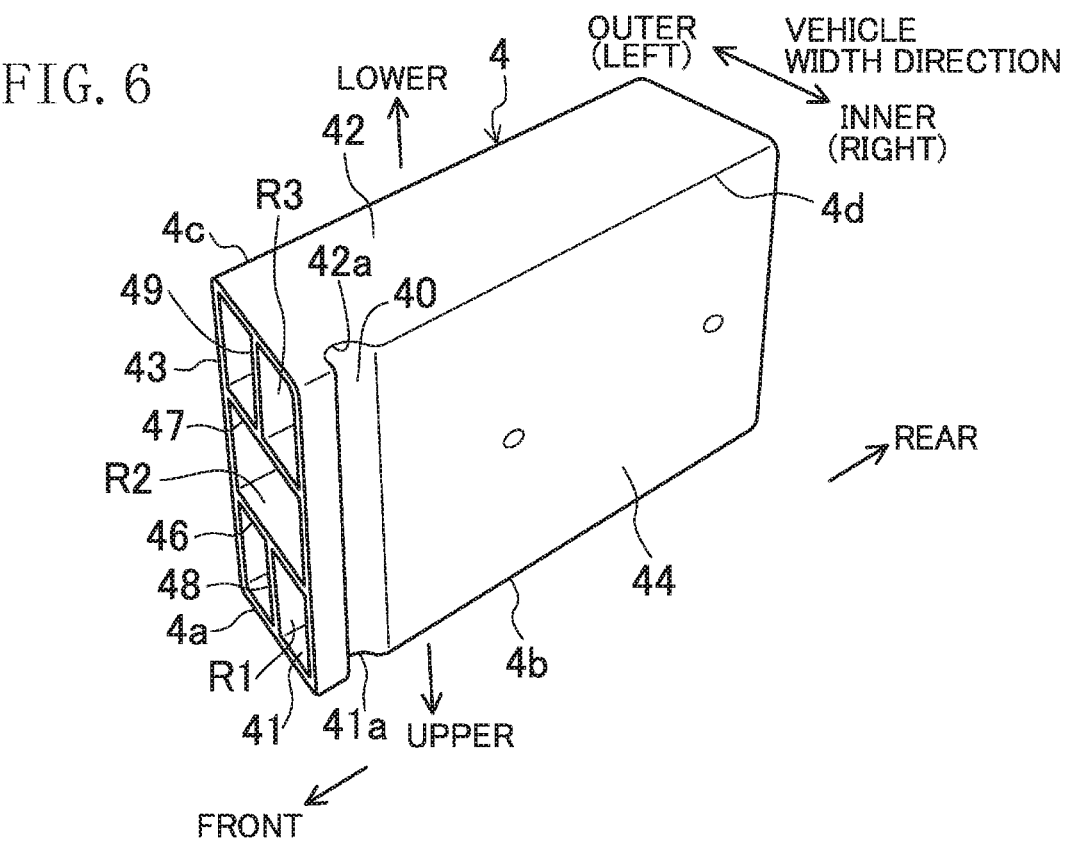
FIG. 6 is a perspective view when a left crush can is viewed from the lower right.

Since the left front side frame 2 and the right front side frame 3 are symmetrical in the right and left direction, the structure of the left front side frame 2 will be described in detail below. As illustrated in FIG. 3 to FIG. 5, the left front side frame 2 has an upper plate part 21 and a lower plate part 22 extending in the right and left direction while being separated from each other in the vertical direction, a left plate part 23 extending in the vertical direction to connect the left end portions of the upper plate part 21 and the lower plate part 22 to each other, and a right plate part 24 extending in the vertical direction to connect the right end portions of the upper plate part 21 and the lower plate part 22 to each other, and has an approximately rectangular sectional shape as a whole. The dimensions of the left plate part 23 and the right plate part 24 in the vertical direction are set to be longer than those of the upper plate part 21 and the lower plate part 22 in the right and left direction.

As illustrated in FIG. 3, the upper plate part 21 extends approximately horizontally from the front end portion to the rear end portion of the left front side frame 2. The lower plate part 22 extends from the front end portion to the vicinity of the rear end portion of the left front side frame 2 in approximately parallel to the upper plate part 21, but the vicinity of the rear end portion of the lower plate part 22 is curved and extends to the rear side from the vicinity of the rear end portion of the lower plate part 22 to the rear end portion while being inclined downward. As illustrated in FIG. 4 and FIG. 5, the left plate part 23 constitutes an outer part of the left front side frame 2 in the vehicle width direction, and the right plate part 24 constitutes an inner part of the left front side frame 2 in the vehicle width direction.

The left plate part 23 is provided with an outer recessed linear portion 23a for reinforcement. The outer recessed liner portion 23a is formed in the intermediate portion of the left plate part 23 in the vertical direction, and recessed toward an inner side (right side) of the left front side frame 2 and extending in the front and rear direction. The outer recessed linear portion 23a is recessed toward the inner side of the left front side frame 2, so that it is possible to reinforce the left front side frame 2 without narrowing a lateral space of the left front side frame 2.

The outer recessed linear portion 23a is not formed at a front end portion of the left plate part 23, and extends continuously from a rear portion, other than the front end portion of the left plate part 23, to a rear end portion of the left plate part 23. The depth of the outer recessed linear portion 23a is set shallower toward a front end portion of the outer recessed linear portion 23a and deeper toward a rear end portion of the outer recessed linear portion 23a. The depth of the outer recessed linear portion 23a is a dimension of the outer recessed linear portion 23a in the right and left direction. Furthermore, a dimension of the outer recessed linear portion 23a in the vertical direction is set approximately constant from the front end portion to the rear end portion of the outer recessed linear portion 23a, and in the embodiment, the dimension of the outer recessed linear portion 23a in the vertical direction corresponds to about ⅓ of a dimension of the left front side frame 2 in the vertical direction and is approximately equal to a separation dimension in the vertical direction of an upper horizontal rib 46 and a lower horizontal rib 47 of the crush can 4 to be described later.

Although illustrated only in FIG. 4 and FIG. 5, the outer recessed linear portion 23a includes an upper portion 23b and a lower portion 23c projecting to the inner side of the left front side frame 2, and an intermediate plate portion 23d vertically extending from a distal end portion (right end portion) of the upper portion 23b in the projecting direction to a distal end portion (right end portion) of the lower portion 23c in the projecting direction. A separation dimension between the upper portion 23b and the lower portion 23c corresponds to the dimension of the outer recessed linear portion 23a in the vertical direction. The upper portion 23b is inclined to be located lower toward the right end portion. Furthermore, the lower portion 23c is inclined to be located upper toward the right end portion.

The right plate part 24 is provided with an inner recessed linear portion 24a for reinforcement. The inner recessed liner portion 24a is formed in the intermediate portion of the right plate part 24 in the vertical direction, and recessed toward an inner side (left side) of the left front side frame 2 and extending in the front and rear direction. The inner recessed linear portion 24a is not formed at a front end portion of the right plate part 24, and extends continuously from a rear portion, other than the front end portion of the right plate part 24, to a rear end portion of the right plate part 24. That is, since the inner recessed linear portion 24a and the outer recessed linear portion 23a are not formed at the front end portion of the left front side frame 2, the front end portion of the left front side frame 2 has an approximately rectangular cross-section that is long in the vertical direction. In this way, the upper portion of the front end portion of the left front side frame 2 is provided with two ridge line portions 2a and 2b spaced apart from each other in the right and left direction, and the lower portion of the front end portion of the left front side frame 2 is provided with two ridge line portions 2c and 2d spaced apart from each other in the right and left direction. The ridge line portions 2a to 2d are continuous from the front end portion to the rear end portion of the left front side frame 2. The portions where the ridge line portions 2a to 2d are formed have a higher strength than that of a flat plate portion of the left front side frame 2.

The depth of the inner recessed linear portion 24a is set shallower toward a front end portion of the inner recessed linear portion 24a and deeper toward a rear end portion of the inner recessed linear portion 24a. Furthermore, a dimension of the inner recessed linear portion 24a in the vertical direction is set to be the same as the dimension of the outer recessed linear portion 23a in the vertical direction.

Similar to the outer recessed linear portion 23a, the inner recessed linear portion 24a includes an upper portion 24b and a lower portion 24c projecting to the inner side of the left front side frame 2, and an intermediate plate portion 24d extending from a distal end portion (left end portion) of the upper portion 24b in the projecting direction to a distal end portion (left end portion) of the lower portion 24c in the projecting direction. The upper portion 24b is inclined to be located lower toward the left end portion. Furthermore, the lower portion 24c is inclined to be located upper toward the left end portion.

The left front side frame 2 includes an outer panel OP and an inner panel IP joined together. The outer panel OP is disposed on an outer side in the vehicle width direction, and the inner panel IP is disposed on an inner side in the vehicle width direction. The outer panel OP and the inner panel IP, for example, are obtained by press-molding a steel plate and the like. Joining flanges OP1 and OP2 are formed on an upper part and a lower part of the outer panel OP, joining flanges IP1 and IP2 are formed on an upper part and a lower part of the inner panel IP, the joining flange OP1 and the joining flange IP1, for example, are joined together by spot welding, and the joining flange OP2 and the joining flange IP2, for example, are joined together by the spot welding. A joining position of the outer panel OP and the inner panel IP is inside (right side) from the center of the left front side frame 2 in the vehicle width direction.

As illustrated in FIG. 3, a frame-side set plate 25 is fixed to the front end portion of the left front side frame 2 so as to extend in the vertical direction. The frame-side set plate 25 is formed to be larger than the outer shape of the front end portion of the left front side frame 2, and is a member for attaching the crush can 4. Similarly, a frame-side set plate 35 is fixed to the front end portion of the right front side frame 3.

(Configuration of Crush can)

Since the left crush can 4 and the right crush can 5 are symmetrical in the right and left direction, the structure of the left crush can 4 will be described in detail below. As illustrated in FIG. 6 to FIG. 9, the left crush can 4 includes an extrusion molding member having an upper wall part 41 and a lower wall part 42 formed in a cylindrical shape extending in the front and rear direction and extending in the right and left direction while being separated from each other in the vertical direction, a left wall part 43 extending in the vertical direction to connect the left end portions of the upper wall part 41 and the lower wall part 42 to each other, and a right wall part 44 extending in the vertical direction to connect the right end portions of the upper wall part 41 and the lower wall part 42 to each other. The extrusion molding member, for example, is a member molded by extruding a material such as an aluminum alloy and a magnesium alloy from a cap (not illustrated).

The dimensions of the left wall part 43 and the right wall part 44 in the vertical direction are set larger than those of the upper wall part 41 and the lower wall part 42 in the right and left direction, and the left crush can 4 has an approximately rectangular sectional shape that is long in the vertical direction as a whole. The dimensions of the upper wall part 41 and the lower wall part 42 of the left crush can 4 in the right and left direction are set to be approximately equal to those of the upper plate part 21 and the lower plate part 22 of the left front side frame 2 in the right and left direction. Furthermore, the dimensions of the left wall part 43 and the right wall part 44 of the left crush can 4 in the vertical direction are set approximately equal to those of the left plate part 23 and the right plate part 24 of the left front side frame 2 in the vertical direction.

The upper portion of the front end portion of the left crush can 4 is provided with two ridge line portions 4a and 4b spaced apart from each other in the right and left direction. The lower portion of the front end portion of the left crush can 4 is provided with two ridge line portions 4c and 4d spaced apart from each other in the right and left direction. The ridge line portions 4a to 4d are continuous from the front end portion to the rear end portion of the left crush can 4.

Figure 2:
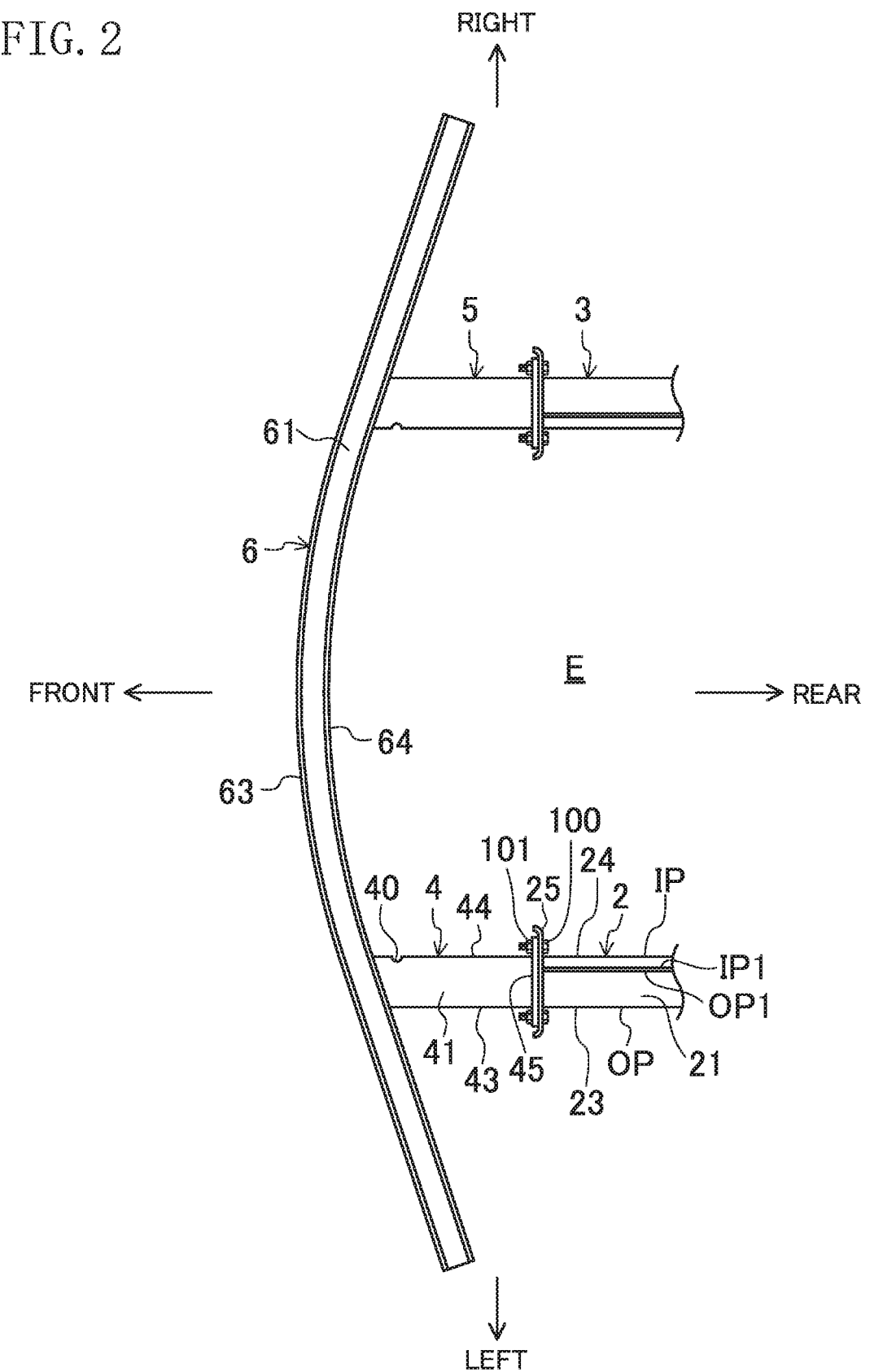
FIG. 2 is a plan view illustrating a front part of the impact absorption structure for the vehicle.

Furthermore, the rear edges of the upper wall part 41 and the lower wall part 42 of the left crush can 4 extend in the right and left direction. The rear edges of the left wall part 43 and the right wall part 44 of the left crush can 4 extend in the vertical direction. In this way, a rear end surface of the left crush can 4 is a surface extending in the vertical direction and the right and left direction, and a crush can-side set plate 45 (illustrated only in FIG. 1 to FIG. 3) is fixed to the rear end surface. The crush can-side set plate 45 and the frame-side set plate 25, for example, are fastened by fastening members such as bolts 100 and nuts 101.

The outer shape of the front end portion of the left front side frame 2 and the outer shape of the rear end portion of the left crush can 4 approximately coincide with each other. In this way, when viewed from the vehicle front and rear direction, the ridge line portions 2a to 2d formed at four portions of the front end portion of the left front side frame 2 and the ridge line portions 4a to 4d formed at four portions of the rear end portion of the left crush can 4 overlap each other, and the front end portions of the upper plate part 21, the lower plate part 22, the left plate part 23, and the right plate part 24 of the left front side frame 2 and the rear end portions of the upper wall part 41, the lower wall part 42, the left wall part 43, and the right wall part 44 of the left crush can 4 overlap each other.

As illustrated in FIG. 3, since the set plates 25 and 45 are interposed between the left front side frame 2 and the left crush can 4, the left front side frame 2 and the left crush can 4 do not contact with each other, but when viewed from the vehicle front and rear direction, the front end portions of the plate parts 21 to 24 of the left front side frame 2 and the rear end portions of the wall parts 41 to 44 of the left crush can 4 are in a positional relation so as to overlap each other. Furthermore, when viewed from the vehicle front and rear direction, the front end portions of the plate parts 21 to 24 of the left front side frame 2 and the rear end portions of the wall parts 41 to 44 of the left crush can 4 do not have to completely overlap each other, and a deviation corresponding to a half of the plate thickness is permitted.

Figure 7:
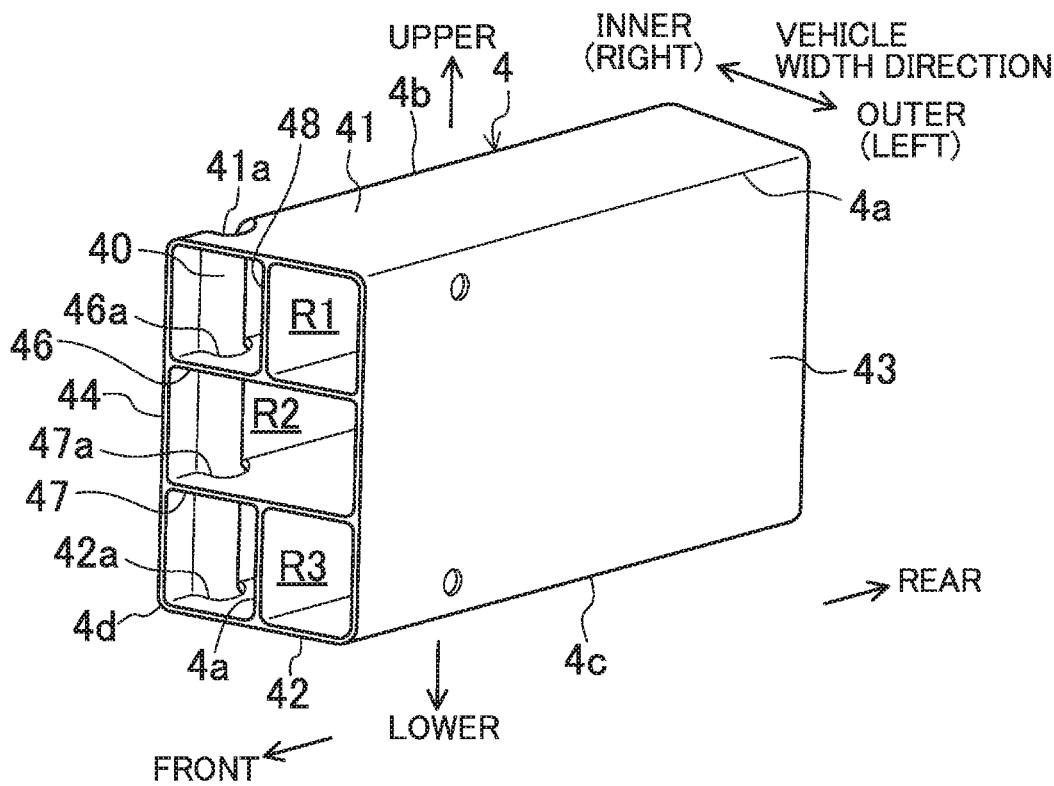
FIG. 7 is a perspective view when the left crush can is viewed from the upper left.
Figure 8:
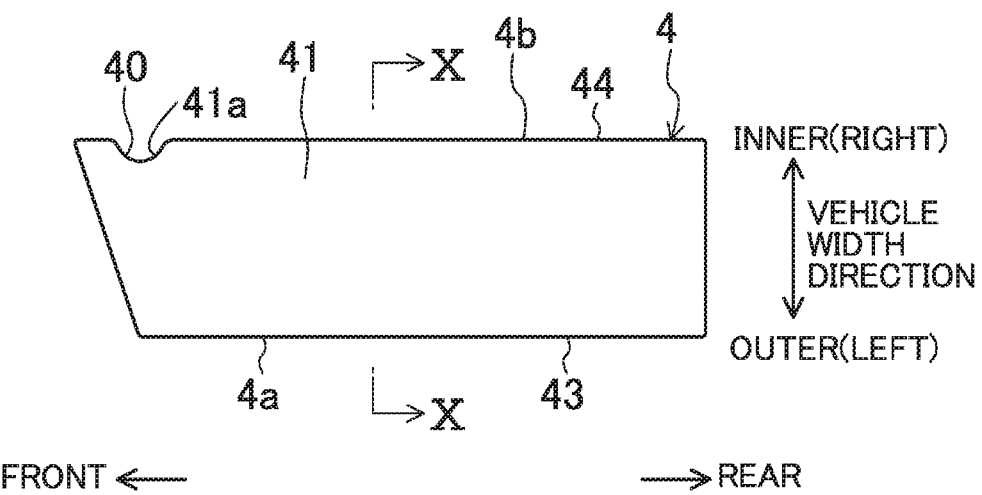
FIG. 8 is a plan view of the left crush can.
Figure 9:
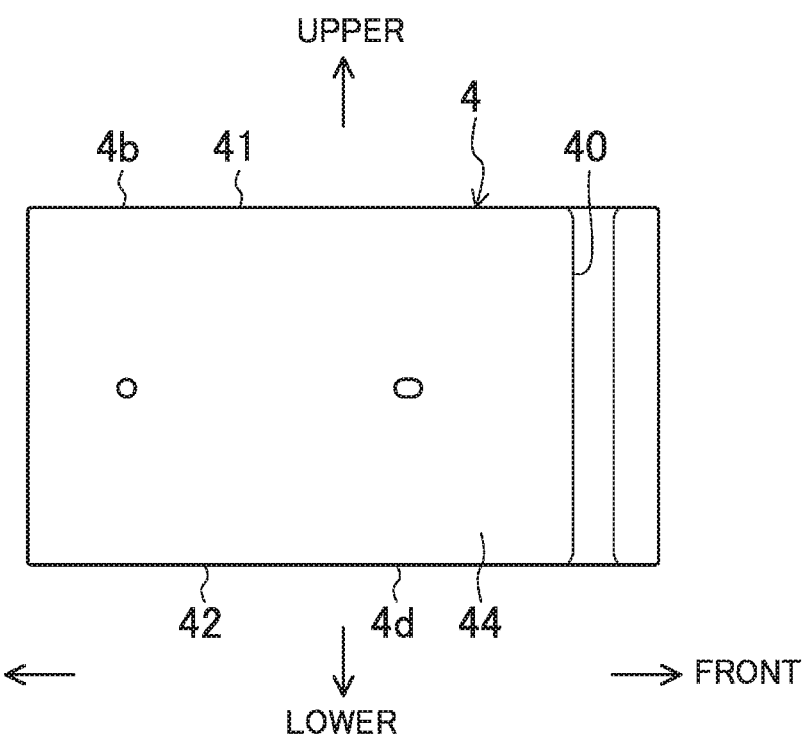
FIG. 9 is a right side view of the left crush can.

On the other hand, as illustrated in FIG. 7 and FIG. 8, the front edges of the upper wall part 41 and the lower wall part 42 of the left crush can 4 extend in the right and left direction while being inclined with a predetermined inclination angle with respect to the right and left direction so as to be located rearward toward the left side. In this way, the front edge of the left wall part 43 of the left crush can 4 is located behind the front edge of the right wall part 44. The front edges of the upper wall part 41 and the lower wall part 42 are shaped to conform to a shape of the bumper beam 6 to be described later. Furthermore, the front edges of the upper wall part 41 and the lower wall part 42 of the left crush can 4 may curve and extend so as to be located rearward toward the left side.

Furthermore, the front edges of the left wall part 43 and the right wall part 44 of the left crush can 4 extend in the vertical direction.

Figure 10:
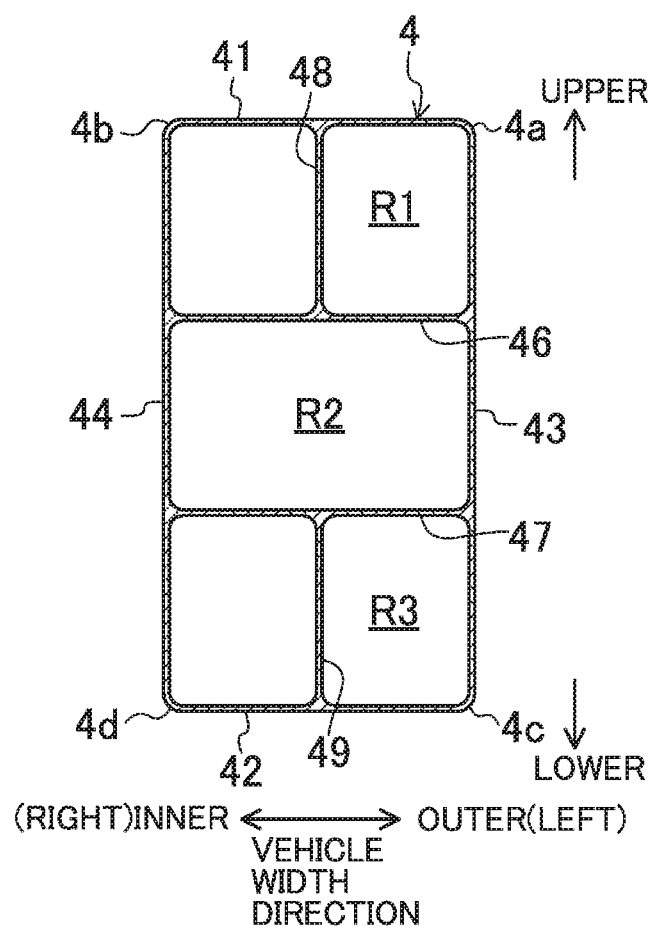
FIG. 10 is a cross-section taken along line X-X in FIG. 8.
Figure 11:
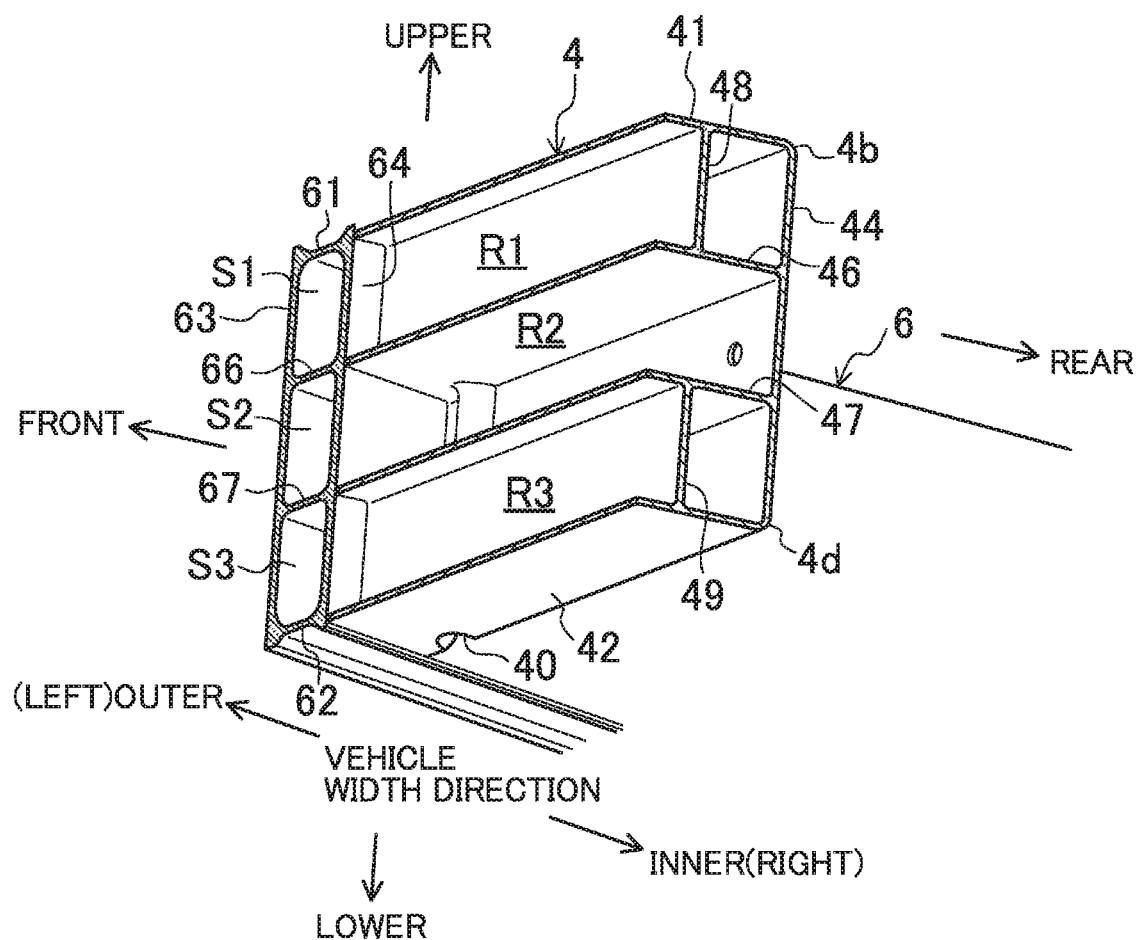
FIG. 11 is a cross-section taken along line XI-XI in FIG. 1.
Figure 12:
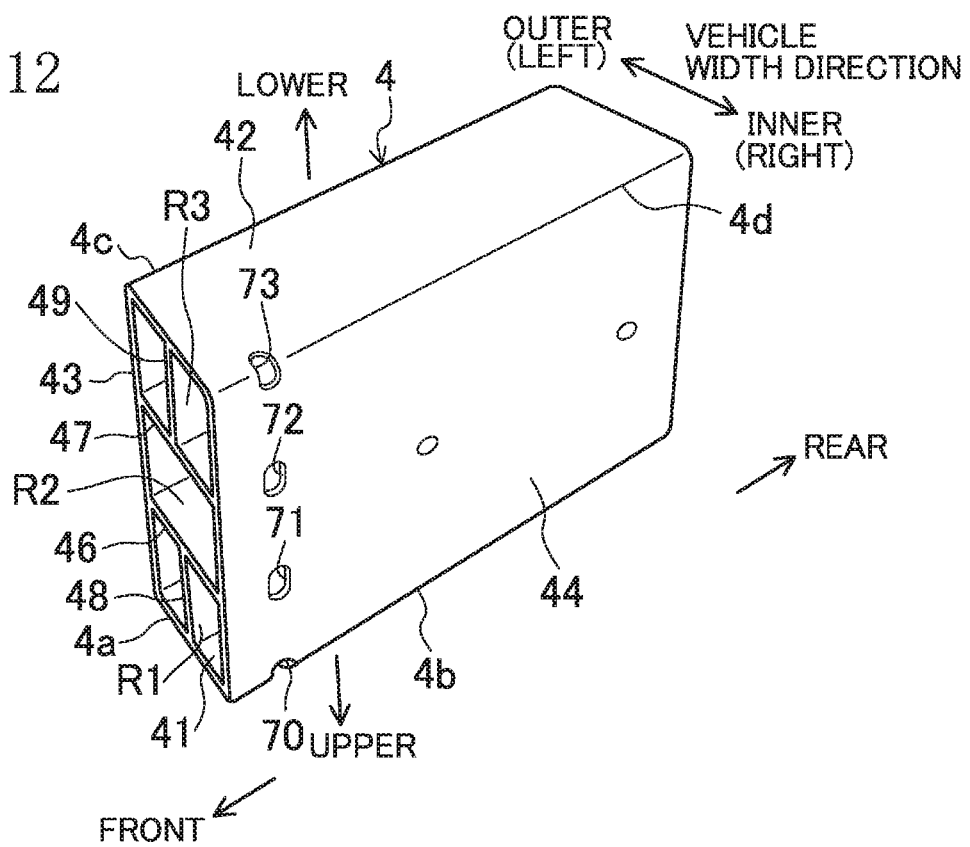
FIG. 12 is a view corresponding to FIG. 6 according to a modification example 1 of the embodiment.
Figure 13:
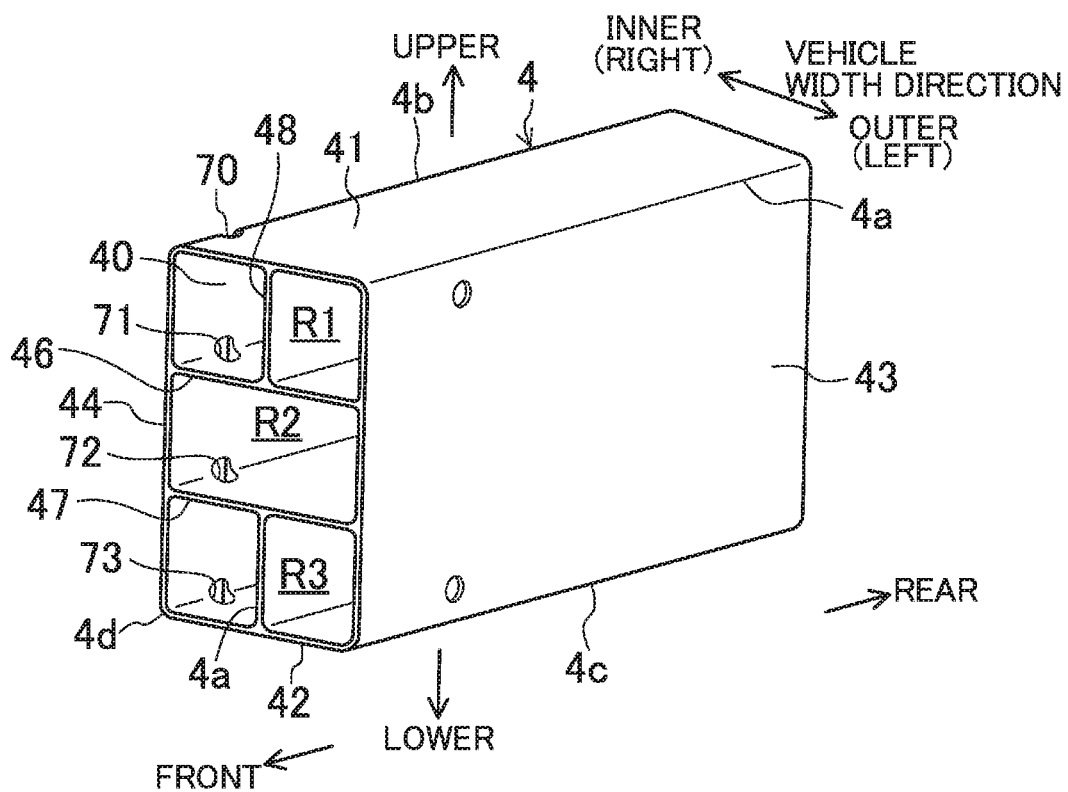
FIG. 13 is a view corresponding to FIG. 7 according to the modification example 1 of the embodiment.
Figure 14:
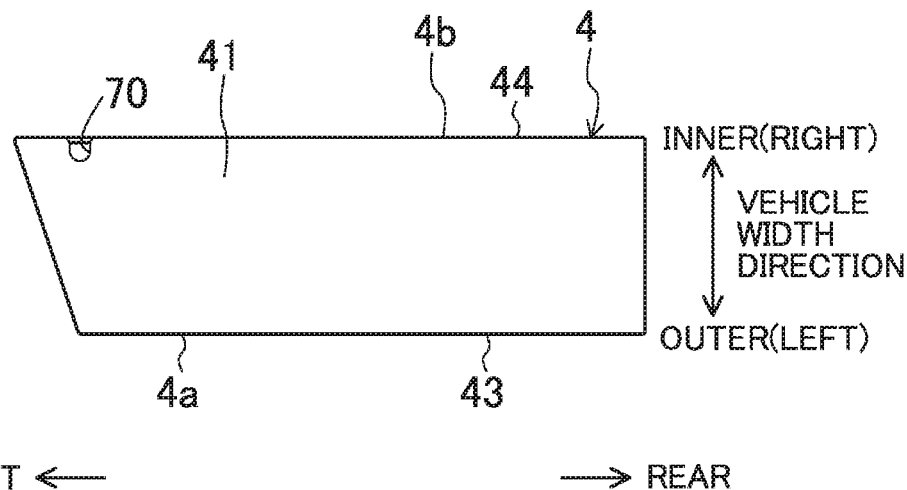
FIG. 14 is a view corresponding to FIG. 8 according to the modification example 1 of the embodiment.
Figure 15:
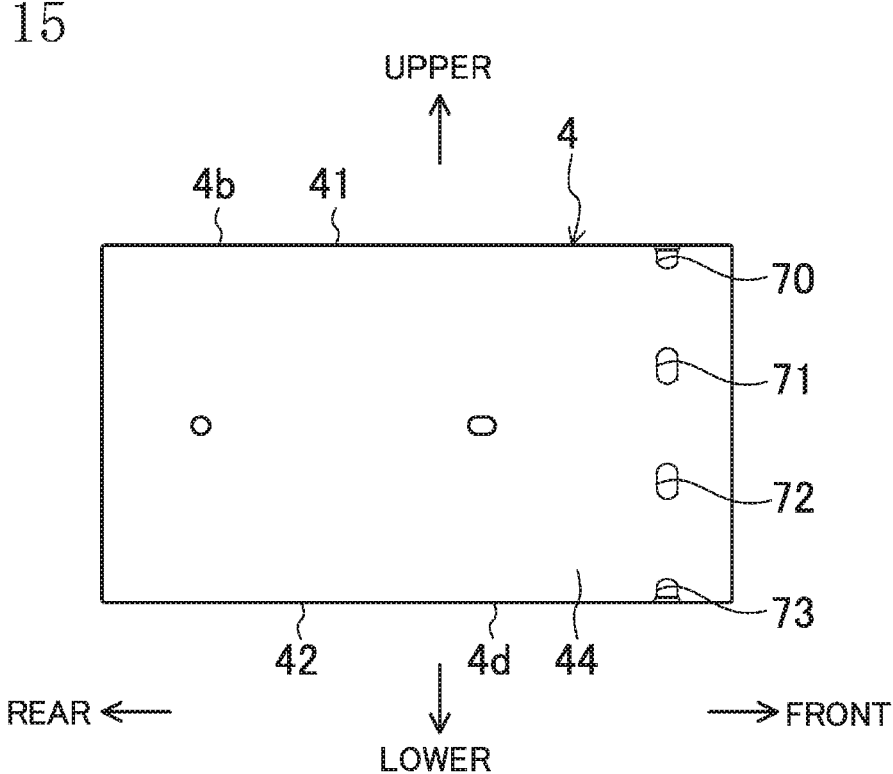
FIG. 15 is a view corresponding to FIG. 9 according to the modification example 1 of the embodiment.
Figure 16:
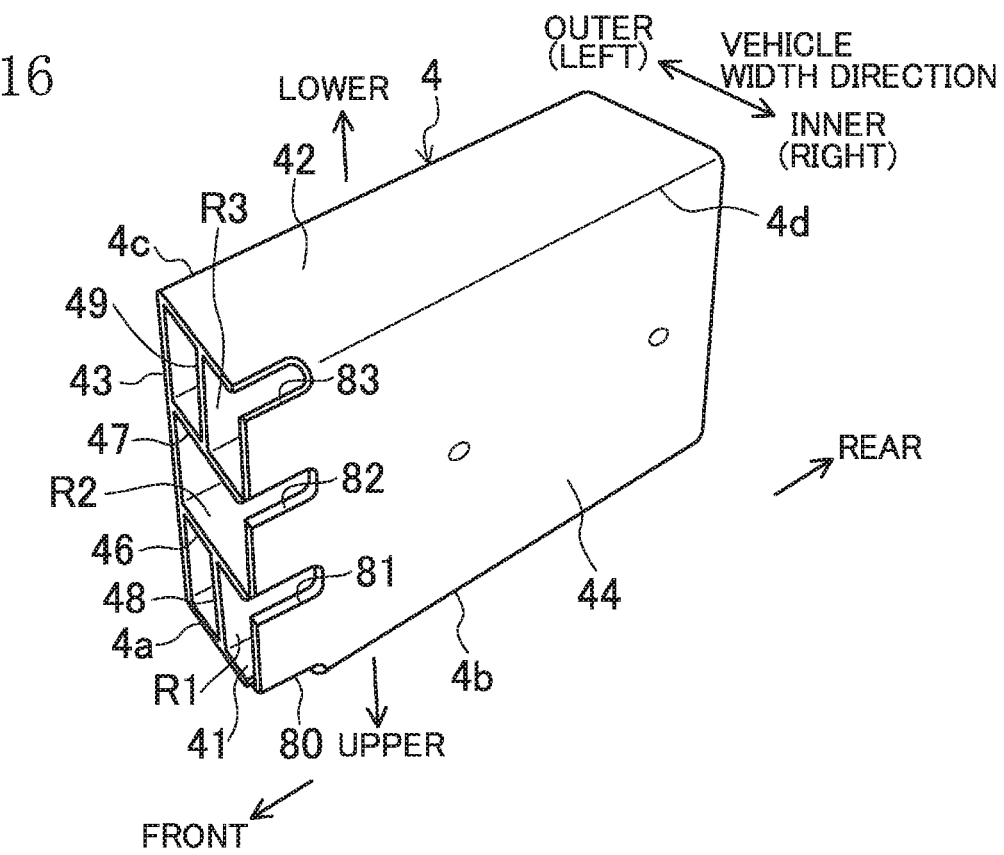
FIG. 16 is a view corresponding to FIG. 6 according to a modification example 2 of the embodiment.
Figure 17:
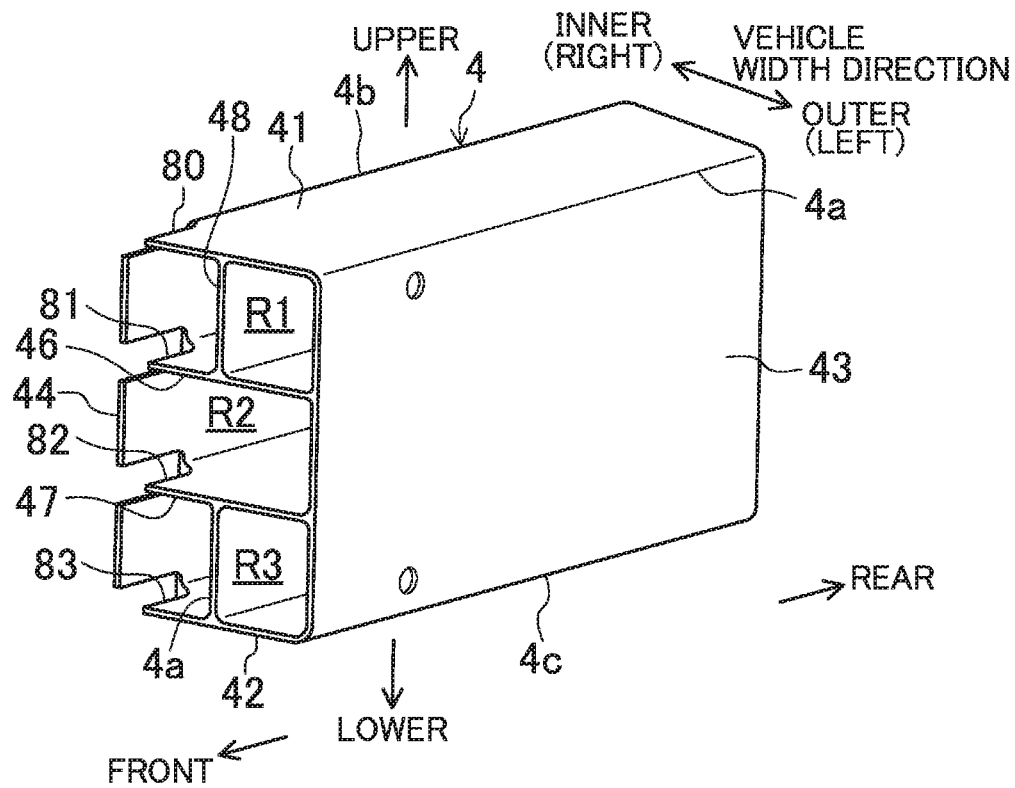
FIG. 17 is a view corresponding to FIG. 7 according to the modification example 2 of the embodiment.
Figure 18:
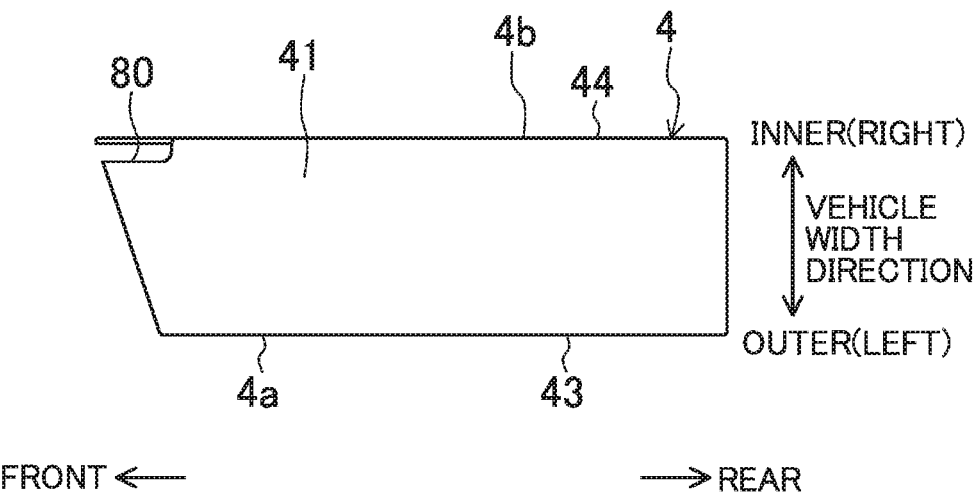
FIG. 18 is a view corresponding to FIG. 8 according to the modification example 2 of the embodiment.
Figure 19:
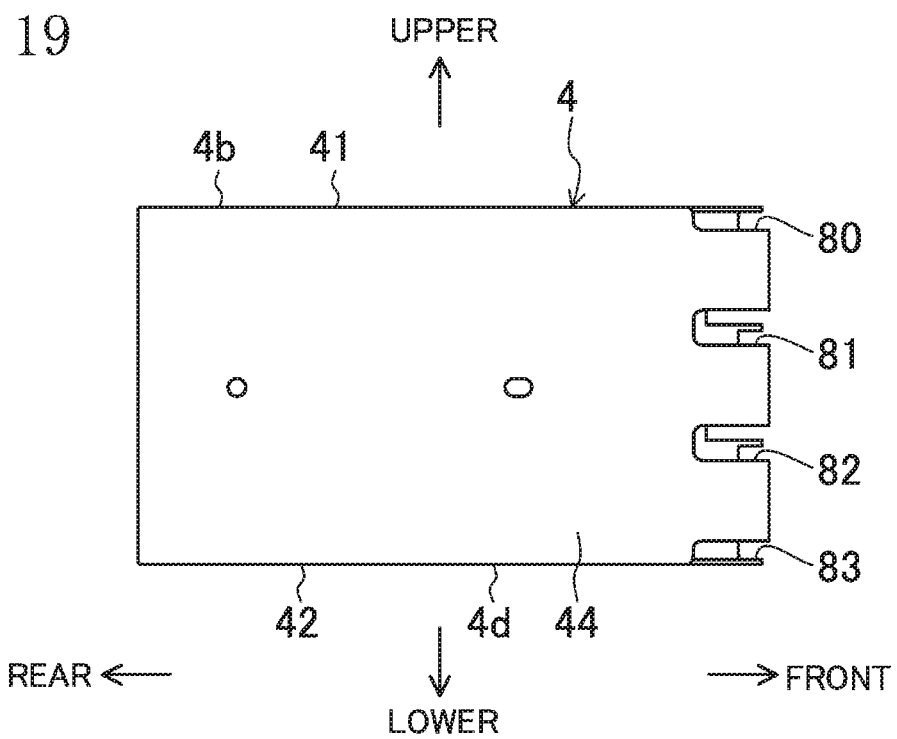
FIG. 19 is a view corresponding to FIG. 9 according to the modification example 2 of the embodiment.

As illustrated in FIG. 7 and FIG. 10, the left crush can 4 is provided therein with an upper horizontal rib (a first rib) 46 and a lower horizontal rib (a second rib) 47 extending from the right wall part 44 to the left wall part 43, and extending in the front and rear direction continuously to the inner surface of the left crush can 4. The upper horizontal rib 46 and the lower horizontal rib 47 are spaced apart from each other in the vertical direction. Furthermore, the left crush can 4 is provided therein with an upper vertical rib 48 and a lower vertical rib 49. The upper vertical rib 48 extends in the vertical direction from the upper wall part 41 to the upper horizontal rib 46, and in the front and rear direction continuously to the inner surface of the left crush can 4. The lower vertical rib 49 extends in the vertical direction from the lower wall part 42 to the lower horizontal rib 47, and in the front and rear direction continuously to the inner surface of the left crush can 4.

That is, the upper horizontal rib 46 extends in the right and left direction from a part, above the vertical center, of the right wall part 44 to a part, above the vertical center, of the left wall part 43, and extends from the front end portion to the rear end portion of the left crush can 4 approximately in parallel to the upper wall part 41. The lower horizontal rib 47 extends in the right and left direction from a part, below the vertical center, of the right wall part 44 to a part, below the vertical center, of the left wall part 43, and extends from the front end portion to the rear end portion of the left crush can 4 approximately in parallel to the lower wall part 42. By the upper horizontal rib 46 and the lower horizontal rib 47, the inside of the left crush can 4 is divided into three spaces in the vertical direction, that is, an upper space R1, a center space R2, and a lower space R3. In the embodiment, the dimensions of the upper space R1, the center space R2, and the lower space R3 in the vertical direction are set to be approximately equal to one another.

The heights of the upper horizontal rib 46 and the lower horizontal rib 47 are set approximately equal to those of the outer recessed linear portion 23a and the inner recessed linear portion 24a of the left front side frame 2. Specifically, the height of the upper horizontal rib 46 is set to approximately the same heights as the upper portion 23b constituting the outer recessed linear portion 23a and the upper portion 24b constituting the inner recessed linear portion 24a. The height of the lower horizontal rib 47 is set to approximately the same heights as the lower portion 23c constituting the outer recessed linear portion 23a and the lower portion 24c constituting the inner recessed linear portion 24a.

The upper vertical rib 48 extends in the vertical direction from the center of the upper wall part 41 in the right and left direction to the center of the upper horizontal rib 46 in the right and left direction, and extends from the front end portion to the rear end portion of the left crush can 4 approximately in parallel to both the right and left wall parts 44 and 43. By the upper vertical rib 48, the upper space R1 is divided into two spaces in the right and left direction. The lower vertical rib 49 extends in the vertical direction from the center of the lower wall part 42 in the right and left direction to the center of the lower horizontal rib 47 in the right and left direction, and extends from the front end portion to the rear end portion of the left crush can 4 approximately in parallel to both the right and left wall parts 44 and 43. By the lower vertical rib 49, the lower space R3 is divided into two spaces in the right and left direction.

The upper wall part 41 and the lower wall part 42 have approximate the same thickness, and the left wall part 43 and the right wall part 44 also have approximate the same thickness. Moreover, the upper horizontal rib 46 and the lower horizontal rib 47 have approximate the same thickness, and the upper vertical rib 48 and the lower vertical rib 49 also have approximate the same thickness.

The left crush can 4 is provided with an induction part 40 for inducing crushing when a compressive load acts in the front and rear direction. The induction part 40 includes a bead formed to be recessed to the left in a position separated rearward from the front end portion of the right wall part 44 at the front portion of the right wall part 44, and extends from an upper end portion to a lower end portion of the right wall part 44. A horizontal cross-section of the induction part 40 is a shape of substantially circular arc opened rightward. Since the induction part 40 is a groove-like part, a part of right edges of the upper wall part 41 and the lower wall part 42 is cut out, so that cutout portions 41a and 42a are formed in the upper wall part 41 and the lower wall part 42. Similarly, a part of right edges of the upper horizontal rib 46 and the lower horizontal rib 47 is cut out, so that cutout portions 46a and 47a are formed in the upper horizontal rib 46 and the lower horizontal rib 47. On the other hand, the left wall part 43 of the left crush can 4 is provided with no induction part. The induction part 40 may be omitted.

(Configuration of Bumper Beam)

The bumper beam 6 is formed in a cylindrical shape extending in the vehicle width direction. That is, the bumper beam 6 has an upper plate part 61 and a lower plate part 62 extending in the right and left direction while being separated from each other in the vertical direction, a front plate part 63 extending in the vertical direction to connect the front end portions of the upper plate part 61 and the lower plate part 62 to each other, and a rear plate part 64 extending in the vertical direction to connect the rear end portions of the upper plate part 61 and the lower plate part 62 to each other, and has an approximately rectangular sectional shape as a whole. The dimensions of the front plate part 63 and the rear plate part 64 in the vertical direction are set larger than those of the upper plate part 61 and the lower plate part 62 in the right and left direction.

Similar to the crush cans 4 and 5, the bumper beam 6 can also be formed into an extrusion molding member; however, the present disclosure is not limited thereto and the bumper beam 6 may be configured with a press-molded plate material. The bumper beam 6 is formed to curve as a whole in the plan view and has a shape in which both sides of the bumper beam 6 in the vehicle width direction are located closer to the rear side as getting closer to the outer sides in the vehicle width direction, that is, the bumper beam 6 has a shape in which the center in the vehicle width direction is located at the frontmost position. Such a shape of the bumper beam 6 is decided from a relation of vehicle design. Furthermore, the bumper beam 6 may have an inclined shape in the plan view such that it is located on the rear side toward the outer side in the vehicle width direction.

The bumper beam 6 is provided therein with an upper horizontal rib (a first rib) 66 and a lower horizontal rib (a second rib) 67 extending from the front plate part 63 to the rear plate part 64, and extending continuously to the inner surface of the bumper beam 6. The upper horizontal rib 66 and the lower horizontal rib 67 are spaced apart from each other in the vertical direction. The upper horizontal rib 66 extends in front and rear direction from a part above the vertical center, of the front plate part 63, to a part, above the vertical center, of rear plate part 64. The upper horizontal rib 66 extends from the left end portion to the right end portion of the bumper beam 6 approximately in parallel to the upper plate part 61. The lower horizontal rib 67 extends in the front and rear direction from a part below the vertical center, of the front plate part 63, to a part, below the vertical center, of the rear plate part 64. The lower horizontal rib 67 extends from the left end portion to the right end portion of the bumper beam 6 approximately in parallel to the lower plate part 62.

The upper horizontal rib 46 of the left crush can 4 and the upper horizontal rib 66 of the bumper beam 6 are disposed at approximately the same height, and the lower horizontal rib 47 of the left crush can 4 and the lower horizontal rib 67 of the bumper beam 6 are disposed at approximately the same height. Note that, the upper horizontal rib 46 and of the left crush can 4 and the upper horizontal rib 66 of the bumper beam 6 do not have to be disposed at completely the same height, and the lower horizontal rib 47 of the left crush can 4 and the lower horizontal rib 67 of the bumper beam 6 do not have to be disposed at completely the same height, and a deviation corresponding to a half of the plate thickness is permitted.

Furthermore, the upper wall part 41 of the left crush can 4 and the upper plate part 61 of the bumper beam 6 are disposed at the same height, and the lower wall part 42 of the left crush can 4 and the lower plate part 62 of the bumper beam 6 are disposed at the same height. Note that, the upper wall part 41 of the left crush can 4 and the upper plate part 61 of the bumper beam 6 do not have to be disposed at completely the same height, and the lower wall part 42 of the left crush can 4 and the lower plate part 62 of the bumper beam 6 do not have to be disposed at completely the same height, and a deviation corresponding to a half of the plate thickness is permitted.

Furthermore, when viewed from the vehicle front and rear direction, the upper vertical rib 48 and the lower vertical rib 49 of the left crush can 4 and the rear plate part 64 of the bumper beam 6 are disposed to overlap each other.

By the upper horizontal rib 66 and the lower horizontal rib 67 of the bumper beam 6, the inside of the bumper beam 6 is divided into three spaces in the vertical direction, that is, an upper space S1, a center space S2, and a lower space S3. In the embodiment, the dimensions of the upper space S1, the center space S2, and the lower space S3 in the vertical direction are set approximately equal to one another. The heights of the upper horizontal rib 66 and the lower horizontal rib 67 approximately coincide with those of the upper horizontal rib 46 and the lower horizontal rib 47 of the left crush can 4, respectively.

Furthermore, the thicknesses of the front plate part 63 and the rear plate part 64 are approximately equal to each other, and are set thicker than those of the upper plate part 61, the lower plate part 62, the upper horizontal rib 66, and the lower horizontal rib 67. The thicknesses of the upper plate part 61, the lower plate part 62, the upper horizontal rib 66, and the lower horizontal rib 67 are approximately equal to one another. Furthermore, the thicknesses of the upper vertical rib 48 and the lower vertical rib 49 of the left crush can 4 are set thinner than that of the rear plate part 64 of the bumper beam 6.

Advantages of Embodiment

Next, the advantages of the impact absorption structure 1 of the vehicle configured as above will be described. A description will be provided for a case where an impact load of a predetermined degree or less is applied from the front such as when the vehicle collides head on at a low vehicle speed (for example, 15 km/h or less) (light collision). The impact load from the front is applied to the bumper beam 6 via a front bumper and the like (not illustrated), and compressive force acts from the bumper beam 6 to the left crush can 4 and the right crush can 5. Depending on the collision situation, there are a case where the compressive force acts only on the left crush can 4 and a case where the compressive force acts only on the right crush can 5.

Since the left crush can 4 and the right crush can 5 are attached to the left front side frame 2 and the right front side frame 3, they receive the compressive force between the bumper beam 6 and the left front side frame 2 and between the bumper beam 6 and the right front side frame 3, respectively. In such a case, the ridge line portions 2a and 2b are formed at the upper portion of the front end portion of the left front side frame 2, the ridge line portions 2c and 2d are formed at the lower portion thereof, and two portions having a strength higher than that of a flat plate portion are present at the upper portion and the lower portion of the front end portion of the left front side frame 2, respectively, so that the strength of the upper portion and the lower portion of the front end portion of the left front side frame 2 is increased.

On the other hand, similar to the front end portion of the left front side frame 2, since the ridge line portions 4a to 4d are formed at the upper portion and the lower portion of the left crush can 4, the strength of the upper portion and the lower portion of the left crush can 4 is increased. Moreover, the strength of the upper portion of the left crush can 4 is further increased by the upper horizontal rib 46 and the upper vertical rib 48, and the strength of the lower portion of the left crush can 4 is also further increased by the lower horizontal rib 47 and the lower vertical rib 49.

Furthermore, the front end portions of the plate parts 21 to 24 of the left front side frame 2 and the rear end portions of the wall parts 41 to 44 of the left crush can 4 overlap each other, thereby obtaining a positional relation in which a high-strength portion of the upper portion of the left front side frame 2 and a high-strength portion of the upper portion of the left crush can 4 correspond to each other and a positional relation in which a high-strength portion of the lower portion of the left front side frame 2 and a high-strength portion of the lower portion of the left crush can 4 correspond to each other.

In this way, when an impact load is applied to the left crush can 4 via the bumper beam 6, the rear end portion of the left crush can 4 can be firmly and stably supported with the front end portion of the left front side frame 2. Such a feature reduces the risk that the left crush can 4 is displaced in an unexpected direction, so that the left crush can 4 is crushed and deformed between the bumper beam 6 and the left front side frame 2 to exhibit expected energy absorption performance. The same is true to the right crush can 5.

Moreover, the upper horizontal rib 66 of the bumper beam 6 and the upper horizontal rib 46 of the left crush can 4 are disposed at approximately the same height, and the lower horizontal rib 67 of the bumper beam 6 and the lower horizontal rib 47 of the left crush can 4 are disposed at approximately the same height. The ribs 66 and 67 and the ribs 46 and 47 extend in the front and rear direction approximately coinciding with the input direction of an impact load. Hence, the impact load is transmitted from the upper horizontal rib 66 and the lower horizontal rib 67 of the bumper beam 6 to the upper horizontal rib 46 and the lower horizontal rib 47 of the left crush can 4. In this way, at an initial stage in which the impact load at the time of a light collision is applied, the upper horizontal rib 46 and the lower horizontal rib 47 of the left crush can 4 are deformed such that the ribs 46 and 47 can be prevented from serving as props, so that the left crush can 4 is reliably crushed and deformed by the impact load at the time of the light collision.

Furthermore, when viewed from the vehicle front and rear direction, the upper wall part 41 of the left crush can 4 and the upper plate part 61 of the bumper beam 6 are disposed at approximately the same height, and the lower wall part 42 of the left crush can 4 and the lower plate part 62 of the bumper beam 6 are disposed at approximately the same height. Hence, the impact load is transmitted from the upper plate part 61 and the lower plate part 62 of the bumper beam 6 to the upper wall part 41 and the lower wall part 42 of the left crush can 4. In this way, at the initial stage in which the impact load at the time of the light collision is applied, the upper wall part 41 and the lower wall part 42 of the left crush can 4 are deformed such that the upper wall part 41 and the lower wall part 42 can be prevented from serving as props.

Furthermore, a part of the impact load is transmitted to the upper vertical rib 48 and the lower vertical rib 49 of the left crush can 4 via the rear plate part 64 of the bumper beam 6. In such a case, when viewed from the vehicle front and rear direction, the upper vertical rib 48 and the lower vertical rib 49 of the left crush can 4 and the rear plate part 64 of the bumper beam 6 overlap each other, and the thicknesses of the upper vertical rib 48 and the lower vertical rib 49 are thinner than that of the rear plate part 64 of the bumper beam 6. Hence, the upper vertical rib 48 and the lower vertical rib 49 can be deformed with the rear plate part 64 of the bumper beam 6. Thus, the upper vertical rib 48 and the lower vertical rib 49 of the left crush can 4 are prevented from serving as props.

When the left crush can 4 is crushed and deformed, since the induction part 40 is provided at the front portion of the right wall part 44 of the left crush can 4, the right front portion of the left crush can 4 begins to be crushed and deformed and then the other portions begin to be crushed and deformed. In this way, the right side and the left side of the left crush can 4 can be crushed at the same timing, so that it is possible to absorb energy by using the entire left crush can 4.

Furthermore, for example, when a collision load is applied to the intermediate portion of the bumper beam 6 in the vehicle width direction, the crushing deformation of the right wall part 44 of the left crush can 4 is induced by the induction part 40, so that it is possible to reduce the load transmitted to the inside of the left front side frame 2 in the vehicle width direction via the right wall part 44. In this way, the deformation of the inside of the left front side frame 2 in the vehicle width direction is reduced. The same is true to the right crush can 5.

As a consequence, the deformation of the left front side frame 2 and the right front side frame 3 at the time of a light collision is reduced.

Other Embodiments

The aforementioned embodiment is only a simple example in all respects and it should be noted that it is not construed in a manner limited by the example. Moreover, all modifications and changes belonging to equivalents of the claims are considered to fall within the scope of the present invention.

As in a modification example 1 illustrated in FIG. 12 to FIG. 15 and a modification example 2 illustrated in FIG. 16 to FIG. 19, a plurality of cutout portions 70 to 73 and 80 to 83 may be provided at the right side of the left crush can 4 by cutting off a part of a material. The cutout portions 70 to 73 and 80 to 83 of the modification examples 1 and 2 are provided at the front part of the left crush can 4 and operate similar to the aforementioned induction part 40.

The cutout portions 70 to 73 of the modification example 1 are located at portions separated from the front end portion of the right wall part 44 to the rear side, are provided spaced apart from each other in the vertical direction, and serve as through holes. The upper and lower two cutout portions 70 and 73 are formed in the ridge line portions 4a and 4c, respectively. The intermediate two cutout portions 71 and 72 are provided continuously to the right end portions of the upper horizontal rib 46 and the lower horizontal rib 47, respectively.

Furthermore, the cutout portions 80 to 83 of the modification example 2 are provided spaced apart from each other in the vertical direction, and are notches formed by cutting off a predetermined range from the front end portion of the right wall part 44 to the rear side. The upper and lower two cutout portions 80 and 83 are formed in the ridge line portions 4a and 4c, respectively. The intermediate two cutout portions 81 and 82 are provided by continuous cutting to the right end portions of the upper horizontal rib 46 and the lower horizontal rib 47, respectively.

In the modification examples 1 and 2, four cutout portions 70 to 73 and four cutout portions 80 to 83 are provided; however, the present disclosure is not limited thereto and the number of cutout portions may be 3 or less or 5 or more.

The aforementioned embodiment has described a case where the left front side frame 2 and the right front side frame 3 are configured with a press-molded plate material; however, the present disclosure is not limited thereto and the left front side frame 2 and the right front side frame 3 may be configured with an extrusion molding member.

INDUSTRIAL APPLICABILITY

As described above, the impact absorption structure for the vehicle according to the present invention, for example, can be provided at the front part of a passenger vehicle.

DESCRIPTION OF REFERENCE CHARACTERS

1 Impact absorption structure for Vehicle
2, 3 Front Side Frame
4, 5 Crush Can
6 Bumper Beam
41 Upper Wall Part
42 Lower Wall Part
43 Left Wall Part
44 Right Wall Part
46 Upper Horizontal Rib (First Rib)
47 Lower Horizontal Rib (Second Rib)
61 Upper Plate Part
62 Lower Plate Part
63 Front Plate Part
64 Rear Plate Part
66 Upper Horizontal Rib (First Rib)
67 Lower Horizontal Rib (Second Rib)

The invention claimed is:

1. An impact absorption structure for a vehicle in which right and left crush cans are respectively attached to vehicle front end portions of front side frames disposed on both right and left sides of the vehicle and extending in a vehicle front and rear direction, and a bumper beam is attached to vehicle front end portions of the right and left crush cans to extend in a vehicle width direction, wherein
- each of the crush cans is formed in a cylindrical shape extending in the vehicle front and rear direction and is provided therein with a rib extending in the vehicle front and rear direction continuously to an inner surface of the crush can,
- the bumper beam is formed in a cylindrical shape extending in a vehicle width direction and is provided therein with a rib extending in the vehicle front and rear direction continuously to an inner surface of the bumper beam,
- the rib of the crush can and the rib of the bumper beam are disposed at approximately a same height,
- the crush can includes an upper wall part and a lower wall part extending in the vehicle front and rear direction,
- the bumper beam includes an upper plate part and a lower plate part extending in the vehicle front and rear direction, and
- the upper wall part of the crush can and the upper plate part of the bumper beam are disposed at approximately a same height, and the lower wall part of the crush can and the lower plate part of the bumper beam are disposed at approximately a same height.

2. The impact absorption structure for the vehicle of claim 1, wherein
- the crush can is provided therein with a first rib and a second rib extending in the vehicle front and rear direction and spaced apart from each other in a vertical direction,
- the bumper beam is provided therein with a first rib and a second rib extending in the vehicle front and rear direction and spaced apart from each other in the vertical direction, and
- the first rib of the crush can and the first rib of the bumper beam are disposed at approximately a same height, and the second rib of the crush can and the second rib of the bumper beam are disposed at approximately a same height.

3. An impact absorption structure for a vehicle in which right and left crush cans are respectively attached to vehicle front end portions of front side frames disposed on both right and left sides of the vehicle and extending in a vehicle front and rear direction, and a bumper beam is attached to vehicle front end portions of the right and left crush cans to extend in a vehicle width direction, wherein
- each of the crush cans is formed in a cylindrical shape extending in the vehicle front and rear direction and is provided therein with a rib extending in the vehicle front and rear direction continuously to an inner surface of the crush can,
- the bumper beam is formed in a cylindrical shape extending in a vehicle width direction and is provided therein with a rib extending in the vehicle front and rear direction continuously to an inner surface of the bumper beam,
- the rib of the crush can and the rib of the bumper beam are disposed at approximately a same height, wherein
- the rib of the crush can is a horizontal rib extending in the vehicle width direction,
- the crush can is provided therein with a vertical rib extending from the horizontal rib to the upper wall part or the lower wall part of the crush can and extending in the vehicle front and rear direction,
- the bumper beam includes a rear plate part located at a vehicle rear side,
- when viewed from the vehicle front and rear direction, the vertical rib of the crush can and the rear plate part of the bumper beam are disposed to overlap each other, and
- a thickness of the vertical rib of the crush can is set thinner than a thickness of the rear plate part of the bumper beam.

4. An impact absorption structure for a vehicle in which right and left crush cans are respectively attached to vehicle front end portions of front side frames disposed on both right and left sides of the vehicle and extending in a vehicle front and rear direction, and a bumper beam is attached to vehicle front end portions of the right and left crush cans to extend in a vehicle width direction, wherein
- each of the crush cans is formed in a cylindrical shape extending in the vehicle front and rear direction and is provided therein with a rib extending in the vehicle front and rear direction continuously to an inner surface of the crush can,
- the bumper beam is formed in a cylindrical shape extending in a vehicle width direction and is provided therein with a rib extending in the vehicle front and rear direction continuously to an inner surface of the bumper beam,
- the rib of the crush can and the rib of the bumper beam are disposed at approximately a same height,
- the crush can is provided therein with a first rib and a second rib extending in the vehicle front and rear direction and spaced apart from each other in a vertical direction,
- the bumper beam is provided therein with a first rib and a second rib extending in the vehicle front and rear direction and spaced apart from each other in the vertical direction, and
- the first rib of the crush can and the first rib of the bumper beam are disposed at approximately a same height, and the second rib of the crush can and the second rib of the bumper beam are disposed at approximately a same height.

* * * * *